US 6,521,586 B1

(12) United States Patent
Hoogland et al.

(10) Patent No.: US 6,521,586 B1
(45) Date of Patent: *Feb. 18, 2003

(54) SILICONE FOAM CONTROL AGENT

(75) Inventors: Jan Hoogland, Brussels (BE); Anick Colson, Namur (BE); Franck Renauld, Gistoux (BE); Jacqueline L'Hostis, Hellebecq (BE); George Sawicki, Penarth (GB); Sophie Stassen, Rhode-Saint-Genese (BE)

(73) Assignee: Dow Corning S.A., Seneffe (BE)

( * ) Notice: Subject to any disclaimer, the term of this patent is extended or adjusted under 35 U.S.C. 154(b) by 103 days.

This patent is subject to a terminal disclaimer.

(21) Appl. No.: 09/636,799

(22) Filed: Aug. 11, 2000

(30) Foreign Application Priority Data

Aug. 13, 1999 (GB) .................................................. 9919096
Dec. 22, 1999 (GB) .................................................. 9930179

(51) Int. Cl.$^7$ ............................... B01D 19/04; C11D 3/20
(52) U.S. Cl. ...................... 510/466; 516/118; 516/120; 516/121; 510/347; 510/349; 510/361; 510/377; 510/507
(58) Field of Search ............................... 516/117, 118, 516/120, 121; 510/347, 349, 466, 361, 377, 507

(56) References Cited

U.S. PATENT DOCUMENTS

| 3,383,327 | A | * | 5/1968 | Sullivan ..................... 516/117 |
| 3,666,681 | A |   | 5/1972 | Keil .......................... 516/117 |
| 3,843,558 | A | * | 10/1974 | Farminer et al. ........... 510/347 |
| 4,075,118 | A |   | 2/1978 | Gault et al. ................. 510/340 |
| 4,396,524 | A | * | 8/1983 | Hempel et al. ............. 510/228 |
| 4,639,489 | A | * | 1/1987 | Aizawa et al. .............. 516/123 |
| 4,741,861 | A |   | 5/1988 | Okada et al. ................ 516/118 |
| 4,978,471 | A | * | 12/1990 | Starch ......................... 510/317 |
| 5,380,464 | A | * | 1/1995 | McGee et al. .............. 516/118 |
| 5,486,306 | A | * | 1/1996 | L'Hostis et al. ............ 510/228 |
| 5,612,410 | A |   | 3/1997 | Kondo et al. ............... 516/118 |
| 5,648,327 | A |   | 7/1997 | Smerznak et al. .......... 510/340 |
| 5,767,053 | A |   | 6/1998 | Germain et al. ............ 516/120 |
| 5,824,739 | A |   | 10/1998 | Kondo et al. ............... 516/120 |
| 5,908,891 | A |   | 6/1999 | Fey et al. .................... 524/493 |
| 6,136,917 | A |   | 10/2000 | Christiano et al. ........... 516/23 |
| 6,369,022 | B2 | * | 4/2002 | Hoogland et al. .......... 510/347 |

FOREIGN PATENT DOCUMENTS

| EP | 0013028 A1 | 7/1980 | ............ C11D/3/08 |
| EP | 0040091 A1 | 11/1981 | ............ C11D/17/00 |
| EP | 0071481 A1 | 2/1983 | ............ C11D/3/00 |
| EP | 0142910 A1 | 5/1985 | ............ C11D/3/00 |
| EP | 0206522 A2 | 12/1986 | ............ C11D/3/00 |
| EP | 0210721 A2 | 2/1987 | ............ C11D/3/37 |
| EP | 0329842 A | 8/1989 | ............ C11D/3/12 |
| EP | 0336710 A1 | 10/1989 | ............ C11D/3/00 |
| EP | 0414221 A2 | 2/1991 | ............ C11D/3/37 |
| EP | 0459512 A2 | 12/1991 | ............ B01D/19/04 |
| EP | 0484081 A2 | 5/1992 | ............ C11D/3/37 |
| EP | 0 499 364 A1 | * | 8/1992 | |
| EP | 0636684 A2 | 2/1995 | ............ C11D/3/12 |
| EP | 0636685 A2 | 2/1995 | ............ C11D/3/12 |
| EP | 638346 A2 | 2/1995 | ............ B01D/19/04 |
| EP | 663225 A1 | 7/1995 | ............ B01D/19/04 |
| EP | 0718018 A2 | 6/1996 | ............ B01D/19/04 |
| EP | 0723795 A2 | 7/1996 | ............ B01D/19/04 |
| EP | 0831145 A2 | 3/1998 | ............ C11D/3/37 |
| EP | 0913187 A2 | 5/1999 | ............ B01F/5/02 |
| EP | 0995473 A1 | 4/2000 | ............ B01D/19/04 |
| EP | 0997180 A1 | 5/2000 | ............ B01D/19/04 |
| FR | 0217501 A2 | 4/1987 | ............ B01D/19/04 |
| GB | 1224026 | 3/1971 | ............ C08G/47/02 |
| GB | 1407997 | 10/1975 | ............ C11D/10/00 |
| GB | 1523957 | 9/1978 | ............ C11D/17/00 |
| GB | 2009223 A | 6/1979 | ............ C11D/3/37 |
| GB | 2257709 A | 1/1993 | ............ C08L/83/04 |
| GB | 1492939 | 11/1997 | ............ C11D/10/02 |
| GB | 2315757 A | 2/1998 | ............ C08L/83/04 |
| JP | 56139107 A | 10/1981 | ............ B01D/19/04 |
| WO | WO92/13056 A1 | 8/1992 | ............ C11D/3/08 |
| WO | WO92/20770 A1 | 11/1992 | ............ C11D/3/37 |
| WO | WO92/22630 A1 | 12/1992 | ............ C11D/7/14 |
| WO | WO93/01269 A1 | 1/1993 | ............ C11D/3/37 |
| WO | WO93/11752 A1 | 6/1993 | ............ A61K/9/28 |
| WO | WO95/04124 A1 | 2/1995 | ............ C11D/3/00 |
| WO | WO96/06919 A1 | 3/1996 | ............ C11D/17/00 |
| WO | WO96/06921 A1 | 3/1996 | ............ C11D/17/00 |
| WO | WO96/34671 A1 | 11/1996 | ............ B01D/19/04 |
| WO | WO98/00216 A1 | 1/1998 | ............ B01D/19/04 |
| WO | WO98/09701 A1 | 3/1998 | ............ B01D/19/04 |
| WO | WO98/22196 A1 | 5/1998 | ............ B01D/19/04 |
| WO | WO99/29816 A1 | 6/1999 | ............ C11D/3/00 |
| WO | WO99/67354 A1 | 12/1999 | ............ C11D/11/00 |
| WO | WO00/11126 A1 | 3/2000 | ............ C11D/3/37 |
| WO | WO00/11127 A1 | 3/2000 | ............ C11D/3/37 |

OTHER PUBLICATIONS

Shin–Etsu, Self–Emulsifying Antifoamer, Chemical Abstracts, vol. 96, p. 124, 96:54317 (1982).

\* cited by examiner

Primary Examiner—Daniel S. Metzmaier
(74) Attorney, Agent, or Firm—Reising, Ethington, Barnes, Kisselle, Learman & McCulloch, P.C.

(57) ABSTRACT

A foam control agent comprises (A) an organopolysiloxane material having at least one silicon-bonded substituent of the formula X—Ph, wherein X denotes a divalent aliphatic hydrocarbon group and Ph denotes an optionally substituted aromatic group, (B) an organosilicon resin and (C) a hydrophobic filler. The organosilicon resin (B) preferably consists of siloxane units of the formula $R'_a SiO_{4-a/2}$ wherein R' denotes a hydroxyl, hydrocarbon or hydrocarbonoxy group, particularly trialkylsiloxy units and SiO4/2 units, wherein a has a value of from 0.5 to 2.4. The foam control agent may be provided as an emulsion or as a particulate material. It is especially useful as a detergent foam control agent.

28 Claims, No Drawings

SILICONE FOAM CONTROL AGENT

FIELD OF THE INVENTION

This invention is concerned with silicone-based foam control agents, particularly for use in aqueous compositions, preferably detergent compositions.

In many aqueous systems which are used e.g. in food processes, textile dying, paper production, sewage treatment and cleaning applications, surface active agents are present either as an unwanted ingredient or as deliberately introduced materials to achieve a certain function. Due to the presence of these surface active agents foam is often generated. In certain applications, such as in dish washing by hand, this is a welcome effect but in other applications foam generation can lead to unsatisfactory results. This is for example the case in the dyeing of textiles or in the manufacture of paper. In other applications, for example the use of detergent compositions for domestic laundering, the production of foam needs to be controlled rather than avoided. It is important to keep foam formation to an acceptable level when laundering is performed in automatic washing machines, particularly front loading machines. Excessive foam would cause overflow of the washing liquor onto the floor as well as reduction in the efficiency of the laundering operation itself.

BACKGROUND OF THE INVENTION

Silicone-based foam control agents are known and have been incorporated into for example heavy duty detergent powders and liquids for use in automatic washing machines. Silicone foam control agents are regarded as very effective in this application as they can be added in very small quantities and are not affected by e.g. the hardness of water, while traditional foam control compositions, such as soaps, require a certain water hardness for their effectiveness.

The detergent industry is constantly going through an evolution where, due to environmental concern, energy conservation efforts, machine design changes, water conservation and changing laundering habits there is a move towards the use of detergent compositions which will perform at higher efficiency than hitherto. There is a need to control foam from e.g. increased surfactant levels in the detergent compositions, use of surfactants which have a higher foam profile than traditional surfactants, changing laundering conditions. Since silicone foam control agents do not directly contribute to the cleaning power of a detergent composition it is desirable to keep the addition level of such foam control agents to a minimum. There has therefore arisen a need to develop improved foam control agents for incorporation in detergent compositions.

Silicone foam control agents are mostly based on organopolysiloxane materials, which may be linear or branched, and which may contain a variety of silicon-bonded substituents. EP 217501 describes a foam control agent wherein a liquid siloxane component is obtained by mixing 100 parts by weight of a polydiorganosiloxane having triorganosiloxane end-groups, 10 to 125 parts of a polydiorganosiloxane having at least one terminal silanol group and at least 40 silicon atoms and 0.5 to 10 parts of an organopolysiloxane resin comprising monofunctional and tetrafunctional siloxane units in a ratio of from 0.5:1 to 1.2:1, and having at least one silanol group per molecule, and there-after heating the mixture. The specification describes the need to control the amount of resin used in order to retain a liquid polymer, avoiding a gel structure. This indicates that some branching occurs in the siloxane component of the foam control agent. Although foam control agents according to EP 217501 perform adequately in many applications, there is a continuing search for improved foam control agents.

JP-A-56-139107 describes a self-emulsifying antifoaming agent comprising an organopolysiloxane oxyalkylene copolymer of the formula

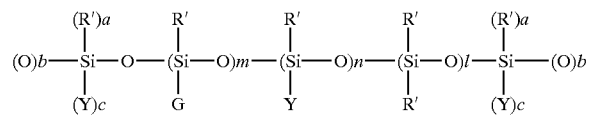

where G is an oxyalkylene group; Y is —CH2CHR"—R5—D or —CH2CHR"COOR", where R" is H or alkyl, R5 is divalent hydrocarbon, for example ethylene, propylene, butylene, phenylene or phenethylene, and D is H or OH; a, b and c are each 0, 1, 2 or 3 and a+b+c=3.

GB2257709 describes a foam control agent which is particularly useful when incorporated in detergent compositions where a high level of high foaming surfactants is present, and comprises a branched polydiorganosiloxane which is prepared through hydrosilylation.

BRIEF SUMMARY OF THE INVENTION

There is still a need to provide more efficient foam control agents. We have now found that if organopolysiloxane materials with certain aromatic substituents are used in the presence of certain organosilicon resins, a more efficient foam control is obtained.

According to a first aspect of the invention, there is provided a foam control agent, comprising (A) an organopolysiloxane material having at least one silicon-bonded substituent of the formula X—Ph, wherein X denotes a divalent aliphatic organic group bonded to silicon through a carbon atom and Ph denotes an aromatic group, (B) an organosilicon resin and (C) a hydrophobic filler. The aromatic group can be unsubstituted or substituted.

DETAILED DESCRIPTION OF THE INVENTION

The organopolysiloxane material (A) is preferably a fluid and is preferably a polydiorganosiloxane. The polydiorganosiloxane (A) preferably comprises diorganosiloxane units of the formula

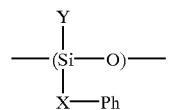

where Y is an alkyl group having 1 to 4 carbon atoms, preferably methyl. These diorganosiloxane units containing a —X—Ph group may comprise substantially all or a majority of the diorganosiloxane units in organopolysiloxane (A), but preferably comprise up to 50 or 60%, most preferably 5 to 40%, of the diorganosiloxane units in (A). The group X is preferably a divalent alkylene group having from 2 to 10 carbon atoms, most preferably 2 to 4 carbon atoms, but can alternatively contain an ether linkage between two alkylene groups or between an alkylene group and —Ph, or can contain an ester linkage. Ph is preferably a moiety containing at least one aromatic ring —$C_6R_5$, wherein each R independently denotes hydrogen, halogen, hydroxyl, an alkoxy group having 1 to 6 carbon atoms or a monovalent hydrocarbon group having 1 to 12 carbon atoms, or wherein two or more R groups together represent a divalent hydrocarbon group. Ph is most preferably a phenyl group, but may be substituted for example by one or more methyl, methoxy, hydroxyl or chloro group, or two substituents R may together form a divalent alkylene group, or may together form an aromatic ring, resulting in conjunction with the Ph group in e.g. a naphthalene group. A particularly preferred X—Ph group is 2-phenylpropyl —CH$_2$—CH(CH$_3$)—C$_6$H$_5$. Alternatively Ph can be a heterocyclic group of aromatic character such as thiophene, pyridine or quinoxaline.

The polydiorganosiloxane (A) also preferably comprises at least 50% diorganosiloxane units of the formula

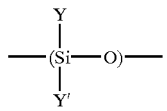

where Y' is a hydrocarbon group having 1 to 24 carbon atoms, preferably an aliphatic group of up to 6 carbon atoms, for example ethyl, propyl, isobutyl, methyl, hexyl or vinyl, or lauryl or a cycloalkyl group such as cyclohexylethyl. Mixtures of alkyl groups Y' can be used. It is believed that the enhanced foam control of the antifoam agents of the invention may involve interaction between the Ph groups of (A) and the organosilicon resin (B), and the Ph groups may be more accessible if no long chain alkyl groups are present. Other groups can be present as Y', for example haloalkyl groups such as chloropropyl or acyloxyalkyl or alkoxyalkyl groups. At least some of the groups Y' can be phenyl groups or substituted phenyl groups such as tolyl; aromatic groups bonded direct to silicon are not equivalent to the groups —X—Ph but can be present as Y'.

The organopolysiloxane material (A) may be made by any suitable method, but preferably is made by hydrosilylation reaction between a siloxane polymer having a number of silicon-bonded hydrogen atoms with the appropriate amount of X"—Ph molecules, wherein X" is as described for X, but has aliphatic unsaturation in the terminal group, allowing addition reaction with the silicon-bonded hydrogen atoms of the siloxane polymer. Examples of suitable X"—Ph materials include styrene (which introduces 2-phenylethyl groups), α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4- or 2,5-dimethylstyrene or 2,4,6-trimethylstyrene. α-methyl styrene introduces 2-phenylpropyl groups, which are believed to be mainly 2-phenyl-1-propyl groups but may include 2-phenyl-2-propyl groups. Mixtures of X"—Ph materials can be used, for example styrene with α-methyl styrene. Such hydrosilylation reaction is preferably carried out under conditions and in the presence of suitable catalysts as described, for example, in U.S. Pat. No. 4,741,861. A radical inhibitor is preferably present to prevent homopolymerisation of X"—Ph.

The organopolysiloxane material (A) may be a substantially linear polydiorganosiloxane or may have some branching. The branching may be in the siloxane chain, brought about e.g. by the presence of some tri-functional siloxane units of the formula ZSiO$_{3/2}$, where Z denotes a hydrocarbon, hydroxyl or hydrocarbonoxy group. Alternatively branching may be caused by a multivalent, e.g. divalent or trivalent, organic or silicon-organic moiety linking siloxane polymer chains. The organic moiety can be a divalent linking group of the formula —X'—, and the silicon-organic moiety can be a divalent linking group of the formula X'—Sx—X', where X' denotes a divalent organic group bonded to silicon through a carbon atom and Sx is an organosiloxane group. Examples of organic linking (branching) units are C$_{2-6}$ alkylene groups, e.g. dimethylene or hexylene, or aralkylene groups of the formula —X'—Ar—X'—, where Ar denotes phenylene. Hexylene units can be introduced by reaction of 1,5-hexadiene with Si—H groups and —X'—Ar—X'— units by reaction of divinylbenzene or diisopropylbenzene. Examples of silicon-organic linking units are those of the formula —(CH$_2$)$_d$—(Si(CH$_3$)$_2$—O)$_e$—Si(CH3)2—(CH$_2$)$_d$— wherein d has a value of from 2 to 6 and e has a value of from 1 to 10; for example linking units of the latter formula with d=2 and e=1 can be introduced by reaction of divinyltetramethyldisiloxane with Si—H groups.

After the hydrosilylation reaction with the aromatic compound X"—Ph and any required reaction with a branching agent, the residual Si—H groups of the organopolysiloxane can be reacted with an alkene such as ethylene, propylene, isobutylene or 1-hexene, preferably in the presence of a hydrosilylation catalyst, to introduce the groups Y'.

It is preferred that the number of siloxane units (DP or degree of polymerisation) in the average molecule of material (A) is at least 5, more preferably from 10 to 5,000. Particularly preferred are materials (A) with a DP of from 20 to 1000, more preferably 20 to 200. The end groups of the organopolysiloxane (A) can be any of those conventionally present in siloxanes, for example trimethylsilyl end groups.

The organosilicon resin (B) is generally a non-linear siloxane resin and preferably consists of siloxane units of the formula R'$_a$SiO$_{4-a/2}$ wherein R' denotes a hydroxyl, hydrocarbon or hydrocarbonoxy group and wherein a has an average value of from 0.5 to 2.4. The resin preferably consists of monovalent trihydrocarbonsiloxy (M) groups of the formula R"$_3$SiO$_{1/2}$ and tetrafunctional (Q) groups SiO$_{4/2}$ wherein R" denotes a monovalent hydrocarbon group. The number ratio of M groups to Q groups is preferably in the range 0.4:1 to 2.5:1 (equivalent to a value of a in the formula R'$_a$SiO$_{4-a/2}$ of 0.86 to 2.15), and is more preferably 0.4:1 to 1.1:1 and most preferably 0.5:1 to 0.8:1 (equivalent to a=1.0–1.33) for use in laundry detergent applications. The organosilicon resin (B) is preferably a solid at room temperature, but MQ resins having a M/Q ratio of higher than 1.2, which are generally liquid, can be used successfully. Although it is most preferred that the resin (B) consists only of M and Q groups as defined above, a resin comprising M groups, trivalent R"SiO$_{3/2}$ (T) groups and Q groups can alternatively be used. The organosilicon resin (B) can also contain divalent units R"$_2$SiO$_{2/2}$, preferably at no more than 20% of all siloxane units present. The group R" is preferably an alkyl group having from 1 to 6 carbon atoms, most preferably methyl or ethyl, or phenyl. It is particularly preferred that at least 80%, and most preferably substantially all of the R" groups present are methyl groups. Other hydrocarbon groups may also be present, e.g. alkenyl groups present for example as dimethylvinylsilyl units, preferably in small amounts, most preferably not exceeding 5% of all R" groups. Silicon bonded hydroxyl groups and/or alkoxy, e.g. methoxy, groups may also be present.

Such organosilicon resins are well known. They can be made in solvent or in situ, e.g. by hydrolysis of certain silane materials. Particularly preferred is the hydrolysis and condensation in the presence of a solvent, e.g. xylene, of a precursor of the tetravalent siloxy unit (e.g. tetraorthosilicate, tetraethyl orthosilicate, polyethyl silicate or sodium silicate) and a precursor of mono-valent trialkylsiloxy units (e.g. trimethylchlorosilane, trimethylethoxysilane, hexamethyldisiloxane or hexamethyldisilazane). The resulting MQ resin can if desired be further trimethylsilylated to react out residual Si—OH groups or can be heated in the presence of a base to cause self-condensation of the resin by elimination of Si—OH groups.

The organosilicon resin (B) is preferably present in the antifoam at 1–50% by weight based on organopolysiloxane (A), particularly 2–30% and most preferably 4–15%.

The organosilicon resin (B) may be soluble or insoluble (not wholly dissolved) in the organopolysiloxane (A) when present in the above amounts. Solubility can be measured by observing a mixture of (A) and (B) in an optical microscope. Enhanced foam control in detergent applications has been achieved both by compositions containing dissolved organosilicon resin (B) and by compositions containing dispersed particles of organosilicon resin (B). The factors affecting solubility of (B) in (A) include the proportion of X—Ph groups in (A) (more X—Ph groups increase solubility), the degree of branching in (A), the nature of the groups Y and Y' in (A) (long chain alkyl groups decrease solubility), the ratio of M to Q units in MQ resin (B) (higher ratio of M groups to Q groups increases solubility) and the molecular weight of (B). The solubility of (B) in (A) at ambient temperature can thus be from 0.01% by weight or less up to 15% or more. It may be advantageous to use a mixture of a soluble resin (B) and an insoluble resin (B), for example a mixture of MQ resins having different M/Q ratios. If the organosilicon resin (B) is insoluble in organopolysiloxane (A), the average particle size of resin (B), as measured when dispersed in liquid (A), may for example be from 0.5 to 400 μm, preferably 2 to 50 μm. For industrial foam control applications such as defoaming of black liquor in the paper and pulp industry, resins which are soluble in the siloxane copolymer, such as MQ resins having a high M/Q ratio, are usually preferred.

The resin (B) can be added into the foam control agent as a solution in a non-volatile solvent, for example an alcohol such as dodecanol or 2-butyl-octanol or an ester such as octyl stearate. The resin solution prepared in a volatile solvent, eg xylene, can be united with the non-volatile solvent and the volatile solvent may be removed by stripping or by other forms of separation. In most cases the non-volatile solvent can be left in the foam control agent. It is preferred that the resin (B) is dissolved in an equal amount of non-volatile solvent or less, more preferably no more than about half its weight of solvent. The resin (B) can alternatively be added in solution in a volatile solvent followed stripping off the solvent. If the resin (B) is added as a solution and is insoluble in organopolysiloxane material (A), it will form solid particles with an acceptable particle size on mixing.

The resin (B) can alternatively be added into the foam control agent in the form of solid particles, for example spray dried particles. Spray dried MQ resins are available commercially, for example of average particle size 10 to 200 microns.

The level of insolubility of resin (B) in organopolysiloxane material (A) may affect its particle size in the composition. The lower the solubility of the organosilicon resins in organopolysiloxane material (A), the larger the particle size tends to be when the resin is mixed as a solution into (A). Thus an organosilicon resin which is soluble at 1% by weight in organopolysiloxane material (A) will tend to form smaller particles than a resin which is only soluble at 0.01% by weight. Organosilicon resins (B) which are partly soluble in organopolysiloxane material (A), that is having a solubility of at least 0.1% by weight, are preferred.

The molecular weight of the resin (B) can be increased by condensation, for example by heating in the presence of a base. The base can for example be an aqueous or alcoholic solution of potassium hydroxide or sodium hydroxide, e.g. a solution in methanol or propanol. We have found that for some detergents, foam control agents containing the lower molecular weight MQ resins are the most effective at reducing foam but those containing MQ resins of increased molecular weight are more consistent in giving the same reduced foam levels under different conditions, for example at different wash temperatures or in different washing machines. The MQ resins of increased molecular weight also have improved resistance to loss of performance over time when stored in contact with the detergent, for example as an emulsion in liquid detergent. The reaction between resin and base may be carried out in the presence of the silica, in which case there may be some reaction between the resin and the silica. The reaction with base can be carried out in the presence of the organopolysiloxane (A) and/or in the presence of the non-volatile solvent and/or in the presence of a volatile solvent. The reaction with base may hydrolyse an ester non-volatile solvent such as octyl stearate but we have found that this does not detract from the foam control performance.

The third essential ingredient is a hydrophobic filler (C). Hydrophobic fillers for foam control agents are well known and may be such materials as silica, preferably with a surface area as measured by BET measurement of at least 50 $m^2/g$, titania, ground quartz, alumina, aluminosilicates, organic waxes e.g. polyethylene waxes and microcrystalline waxes, zinc oxide, magnesium oxide, salts of aliphatic carboxylic acids, reaction products of isocyanates with certain materials, e.g. cyclohexylamine, or alkyl amides, e.g. ethylenebisstearamide or methylenebisstearamide. Mixtures of one or more of these are also acceptable.

Some of the fillers mentioned above are not hydrophobic in nature, but can be used if made hydrophobic. This could be done either in situ (i.e. when dispersed in the organopolysiloxane material (A)), or by pre-treatment of the filler prior to mixing with material (A). A preferred filler is silica which is made hydrophobic. This can be done e.g. by treatment with a fatty acid, but is preferably done by the use of methyl substituted organo-silicon materials. Suitable hydrophobing agents include polydimethylsiloxanes, dimethylsiloxane polymers which are end-blocked with silanol or silicon-bonded alkoxy groups, hexamethyldisilazane, hexamethyldisiloxane and organosilicon resins comprising monovalent groups $(CH_3)_3SiO_{1/2}$ and tetravalent groups $SiO_2$ in a ratio of from 0.5/1 to 1.1/1 (MQ resins). Hydrophobing is generally carried out at a temperature of at least 80° C. Similar MQ resins can be used as the organosilicon resin (B) and as the hydrophobing agent for silica filler (C).

Preferred silica materials are those which are prepared by heating, e.g. fumed silica, or by precipitation, although other types of silica such as those made by gel-formation are also acceptable. The silica filler may for example have an average particle size of from 0.5 to 50 microns, preferably 2 to 30 μm, most preferably from 5 to 25 μm. Such materials are well known and are commercially available, both in hydrophilic form and in hydrophobic form.

The amount of filler (C) in the foam control agent of the invention is preferably 0.5 to 50% by weight based on organopolysiloxane material (A), particularly from 1 up to 10% or 15% and most preferably 2–8%. It is also preferred that the ratio of the weight of resin (B) to the weight of filler (C) is from 1/10 to 20/1, preferably 1/5 to 10/1 most preferably 1/2 to 6/1.

The foam control agents according to the invention may be made in any convenient way, but preferably are provided by mixing the different ingredients under shear. The amount of shear is preferably sufficient to provide good dispersion of components (B) and (C) in material (A), but not so much that the particles (B) and/or (C) would be broken, thus possibly making them less effective, or re-exposing surfaces which are not hydrophobic. Where the filler (C) needs to be made hydrophobic in situ, the manufacturing process would include a heating stage, preferably under reduced pressure, in which the filler and the treating agent are mixed together in part or all of organopolysiloxane material (A), possibly in the presence of a suitable catalyst, where required.

The foam control agents according to the present invention may be provided as a simple mixture of (A), (B) and (C), but for some applications it may be preferred to make them available in alternative forms. For example for use in aqueous media, it maybe appropriate to provide the foam control agent in an emulsion form, preferably an oil/in/water emulsion.

Methods of providing silicone-based foam control agents in oil-in-water emulsion form are known and have been described in a number of publications and patent specifications. Examples are EP913,187, EP0879628, WO98-22,196, WO98-00216, GB2,315,757, EP499364, AND EP459,512. Emulsions may be made according to any of the known techniques, and may be macro-emulsions or micro-emulsions. In general, they comprise the foam control agent as the oil phase, one or more surfactants, water and standard additives, such as preservatives, viscosity modifiers, protective colloids and/or thickeners. The surfactants may be selected from anionic, cationic, nonionic or amphoteric materials. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates and/or alkyl sarcosinates. Suitable cationic organic surfactants include alkylamine salts, quaternary ammonium salts, sulphonium salts and phosphonium salts. Suitable nonionic surfactants include silicones such as those described as Surfactants 1-6 in EP 638346, particularly siloxane polyoxyalkylene copolymers, condensates of ethylene oxide with a long chain (fatty) alochol or (fatty) acid, for example $C_{14-15}$ alcohol, condensed with 7 moles of ethylene oxide (Dobanol® 45-7), condensates of ethylene oxide with an amine or an amide, condensation products of ethylene and propylene oxides, esters of glycerol, sucrose or sorbitol, fatty acid alkylol amides, sucrose esters, fluoro-surfactants and fatty amine oxides. Suitable amphoteric organic detergent surfactants include imidazoline compounds, alkylaminoacid salts and betaines. It is more preferred that the organic surfactants are nonionic or anionic materials. Of particular interest are surfactants which are environmentally acceptable. The concentration of foam control agent in an emulsion may vary according to applications, required viscosity, effectiveness of the foam control agent and addition system, and ranges on average from 5 to 80% by weight, preferably 10 to 40%. A foam control emulsion may also contain a stabilising agent such as a silicone glycol copolymer or a crosslinked organopolysiloxane polymer having at least one polyoxyalkylene group, as described in EP663225.

Alternatively the foam control agent can be provided as a water-dispersible composition in which (A), (B) and (C) are dispersed in a water-dispersible carrier such as a silicone glycol or in another water-miscible liquid such as ethylene glycol, propylene glycol, polypropylene glycol, polyethylene glycol, a copolymer of ethylene and propylene glycols, a condensate of a polyalkylene glycol with a polyol, an alkyl polyglycoside, an alcohol alkoxylate or an alkylphenol alkoxylate or in a mineral oil as described in U.S. Pat. No. 5,908,891.

An alternative form of providing a foam control agent according to the present invention is in powdered form. This is particularly useful when the agent is to be used in a powdered product, e.g. a detergent powder. Many patents have discussed and disclosed methods of providing powdered or granulated foam control agents, for example EP723795, EP718018, EP831145, EP995473, EP997180, EP636685, EP636684, EP336710, WO99/67354, WO00/11126, WO00/11127, WO98/09701, WO95/04124, WO92/20770, WO99/29816, WO96/06921, WO96/06919, WO93/01269, WO92/13056, WO92/22630, WO93/11752, WO96/34671, GB1407997, GB1492939, GB1523957, GB2009223, EP13028, EP40091, EP71481, EP142910, EP206522, EP210721, EP329842, EP414221, and EP484081. All these methods can be applied to the foam control agents of the present invention.

Suggested ingredients of particulate foam control agents include, in addition to the foam control agents itself, a binder or encapsulant and a solid carrier or support for the granule. It is preferred that any carrier or binder material should contribute to the efficiency or activity of the product in which it is to be incorporated. A surfactant, for example one or more may be used to aid dispersion of the silicone in the encapsulant or binder. Sometimes other ingredients are incorporated, for example dyes, pigments, preservatives or materials which aid the dispersion in the aqueous medium in which the foam control agent is supposed to be active, such as the surfactants described above in connection with foam control emulsions.

Such a surfactant may help in controlling the "foam profile", that is in ensuring that some foam is visible throughout the wash without overfoaming. Granulated foam control agents may be made by a variety of methods, including granulators, spray drying, emulsification followed by drying, spray mixing, spray chilling, compactors, extruders, high shear mixing, low shear mixing and flaking.

Examples of binders and/or encapsulants are polyoxyalkylene polymers such as polyethylene glycol, which can be applied molten or as an aqueous solution and spray dried, reaction products of tallow alcohol and ethylene oxide, or polypropylene glycol, polycarboxylates, for example polyacrylic acid or a partial sodium salt thereof or a copolymer of acrylic acid, for example a copolymer with maleic anhydride, cellulose ethers, particularly water-soluble or water-swellable cellulose ethers such as sodium carboxymethylcellulose, gelatin, agar, microcrystalline waxes, fatty acids or fatty alcohols having 12 to 20 carbon atoms and a melting point in the range 45 to 80° C., a monoester of glycerol and such a fatty acid, a mixture of a water insoluble wax having a melting point in the range from above 55° C. to below 100° C. and a water-insoluble emulsifying agent, glucose or hydrogenated glucose. A binder which is an organic compound having a melting point of from about 40 to 80° C. and which in its liquid form is miscible with the organopolysiloxane (A) so as to form a homogeneous liquid which upon cooling forms a monophasic wax-like substance (that is a material which is homogeneous and shows no phase separation during the process or on storage of the granules) has the advantage of producing encapsulated antifoam granules of improved storage stability.

The surfactant used to disperse the silicone in the binder or encapsulant can be selected from the surfactants described above in connection with foam control emulsions. Silicone glycols are preferred for many binders, or fatty alcohol ether sulphate or linear alkylbenzene sulphonate may be preferred with a polyacrylic acid binder. The surfactant can be added to the silicone undiluted or in emulsion before the silicone is mixed with the binder, or the surfactant and silicone can successively be added to the binder.

Examples of carriers and/or supports are zeolites, for example Zeolite A or Zeolite X, other aluminosilicates or silicates, for example magnesium silicate, phosphates, for example powdered or granular sodium tripolyphosphate, sodium sulphate, sodium carbonate, sodium perborate, a cellulose derivative such as sodium carboxymethylcellulose, granulated starch, clay, sodium citrate, sodium acetate, sodium bicarbonate and native starch.

The silicone antifoam and the binder can for example be contacted in their liquid phase and deposited on the support, for example by spray-drying onto a fluidised bed of dry powder. Alternatively a solid carrier can be granulated with the silicone-based foam control agent.

The foam control agents of the invention can contain additional ingredients such as a density adjuster, a colour preservative such as a maleate or fumarate, e.g. bis(2-methoxy-1-ethyl)maleate or diallyl maleate, an acetylenic alcohol, e.g. methyl butynol, cyclooctadiene, or cyclic methyl vinyl siloxane which reacts with any residual Pt catalyst present, a thickening agent such as carboxymethyl cellulose, polyvinyl alcohol or a hydrophilic or partially hydrophobed fumed silica, or a colouring agent such as a pigment or dye. The foam control agents can contain a spreading agent, for example polydimethylsiloxane or another known silicone antifoam fluid, generally used at less than 20%, preferably up to 5%, by weight based on organopolysiloxane (A). For example a 12500 mPa.s polydimethylsiloxane fluid added at 1% slightly improved the foam reduction for some detergents. If polydimethylsiloxane is present, it can optionally be premixed with a hydrophobic filler, for example hydrophobic silica.

The formulation of the foam control agent, and in particular the relative proportions of (A), (B) and (C), can be adjusted if desired to match the density of a liquid in which it is to be used to reduce any chance of deposition or creaming of the foam control agent. For example, heavy duty liquid detergents may have a density of 1.025 to 1.05, whereas emulsions generally have a density just above 1.00. A foam control agent comprising 80.7% by weight (A), 13.3% (B), 5% hydrophobic silica filler (C) and 1% hydrophilic silica thickener has a density of 1.038 g/ml, while 81.9% (A), 13.3% (B), 3.25% (C) and 1% thickener gives density 1.028 and 95.7% (A), 3.3% (B) and 1.0% (C) gives density 1.005.

The foam control agents according to this invention are useful for reducing or preventing foam formation in aqueous systems, particularly foam generated by detergent compositions during laundering, and are particularly useful in detergent compositions which have a high foaming characteristic, for example those based on high levels of anionic surfactants, e.g. sodium dodecyl benzene sulphonate, to ensure detergent effectiveness at lower washing temperatures, e.g. 40° C. However, they can also be incorporated in other detergent compositions.

In another aspect of the invention there is provided a detergent composition comprising (1) 100 parts by weight of a detergent component and (2) from 0.01 to 5 parts by weight of a foam control agent as defined above.

Suitable detergent components comprise an active detergent, organic and inorganic builder salts and other additives and diluents. The physical form of the detergent composition can for example be a powder such as a high density or low density powder used for heavy duty detergents, a low density powder as often used for light duty detergents, or in tablet or liquid form. The active detergent may comprise organic detergent surfactants of the anionic, cationic, non-ionic or amphoteric type, or mixtures thereof. Suitable anionic organic detergent surfactants are alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated ethers, sulphosuccinates, alkane sulphonates, phosphate esters, alkyl isethionates, sulphated ethoxylated alcohols, alkyl taurates and/or alkyl sarcosinates. Suitable cationic organic detergent surfactants are alkylamine salts, quaternary ammonium salts, sulphonium salts and phosphonium salts. Suitable non-ionic organic surfactants are condensates of ethylene oxide with a long chain (fatty) alcohol or fatty acid, for example $C_{14-15}$ alcohol, condensed with 7 moles of ethylene oxide (Dobanol 45-7), condensates of ethylene oxide with an amine or an amide, condensation products of ethylene and propylene oxides, N-alkyl glucamides, alkyl glucosides, fatty acid alkylol amides, sucrose esters, fluorosurfactants and fatty amine oxides. Suitable amphoteric organic detergent surfactants are imidazoline compounds, alkylaminoacid salts and betaines. Examples of inorganic components are phosphates and polyphosphates, silicates, such as sodium silicates, carbonates, sulphates, oxygen releasing compounds, such as sodium perborate and other bleaching agents and zeolites. Examples of organic components are anti-redeposition agents such as carboxymethylcellulose (CMC), brighteners, chelating agents, such as ethylene diamine tetraacetic acid (EDTA) and nitrilotriacetic acid (NTA), enzymes and bacteriostats. Liquid detergent compositions may contain solvents, alkanolamines, pH adjusting agents, opacifiers, perfumes, dyes, colour stabilisers, bactericides, brighteners, soil release agents and/ or softening agents.

The foam control agents according to the invention are surprisingly much more effective than prior art foam control agents, especially in surfactant compositions which are more prone to produce high level of foam when agitated. It was found that foam control efficiency is on average at least two times more effective, and in some cases up to 5 or even 10 times. Adequate foam control for use in front loading automatic washing machines has been achieved at levels of 0.05% by weight foam control agent (A+B+C) or even less in detergent compositions where 0.1% of a conventional antifoam allows too much foam. The foam control agents are particularly useful in detergent compositions, but may also be employed in such processes and compositions as paper making and pulping processes, textile dyeing processes, cutting oil, coatings and other aqueous systems where surfactants may produce foam. The foam control agents of the invention have the added advantage compared to polydimethylsiloxane antifoams of a lower tendency to be deposited on fabric, paper or machine parts and hence a lower risk of blemishes such as spotting.

The following examples illustrate the invention. All parts and percentages are expressed by weight unless otherwise stated.

EXAMPLE 1

A foam control agent according to the invention (FCA 1) was prepared by charging a 1-liter flask equipped with a stirrer with 425 g of a copolymer (A) having a degree of polymerisation of 60 and comprising 80 mole % methyl ethyl siloxane groups, 20 mole % methyl α-methylstyrene siloxane groups and 1 mole % divinyl crosslinking groups, and 25 g treated precipitated silica (Sipernat® D10 supplied by Degussa). The mixture was stirred until complete dispersion of the silica. Then 35 g of an organosiloxane resin (B) having trimethyl siloxane units and $SiO_2$ units in a M/Q ratio of 0.65/1, dissolved in octyl stearate (70% solid), was added. The mixture was homogenised through a high shear mixer. The organosilicon resin (B) dissolved in the siloxane copolymer (A).

EXAMPLE 2

A foam control agent (FCA2) was prepared as described in Example 1 but using an organosilicon resin (B) having a M/Q ratio of 0.5/1. The organosilicon resin did not fully dissolve in the siloxane copolymer (A).

EXAMPLE 3

A foam control agent (FCA3) was prepared as described in Example 1 but using an organosilicon resin (B) having a M/Q ratio of 0.8/1. The organosilicon resin dissolved in the siloxane copolymer (A).

EXAMPLE 4

A foam control agent (FCA 4) was prepared as described in Example 1 but using a siloxane copolymer (A) having a degree of polymerisation of 60 comprising 80 mole % methyl dodecyl siloxane groups, 20 mole % methyl alpha-methylstyrene siloxane groups and 0.1 mole % crosslinking groups. The organosilicon resin (B) did not dissolve in this siloxane copolymer.

EXAMPLE 5

A foam control agent (FCA 5) was prepared as described in Example 1 but using an organosilicon resin (B) having a M/Q ratio of 1.2/1. The organosilicon resin dissolved in the siloxane copolymer (A).

COMPARATIVE TESTS

Foam control agents FCA2, FCA3 and FCA5, together with a comparative foam control agent CFCA6 comprising a siloxane copolymer (A) and silica as described in Example 1 but no resin (B), were tested in a wash test. In this experiment, wash tests were carried out at both 40° C. and 95° C. in the Miele front loading washing machines on 3.2 kg loads of towels using 15 liters softened water per wash. The height of foam was observed every 5 minutes throughout each wash test (0=no foam, 50=half window of foam, 100=full window of foam, 120=overflow from the washing machine). The foam control agents were formulated as granules based on a zeolite carrier and a polycarboxylate binder and were all tested at a concentration of 0.12% by weight of detergent. The detergent comprised 60 g sodium tripolyphosphate, 50 g sodium perborate tetrahydrate, 21.8 g linear alkyl benzenesulphonate anionic surfactant and 4.2 g ethoxylated fatty alcohol nonionic surfactant; this detergent was also used for the wash tests relating to Examples 9 to 19 below. The tests were carried out for a wash time of 45 minutes and the results are shown in Table 1 below

TABLE 1

| | | minutes from start | | | | | | | | |
|---|---|---|---|---|---|---|---|---|---|---|
| Example | Temp | 5 | 10 | 15 | 20 | 25 | 30 | 35 | 40 | 45 |
| FCA2 | 40° C. | 0 | 0 | 10 | 10 | 40 | 60 | 70 | 70 | 70 |
| FCA3 | 40° C. | 0 | 30 | 50 | 60 | 60 | 70 | 100 | 100 | 100 |
| FCA5 | 40° C. | 10 | 70 | 100 | 100 | 100 | 100 | 100 | 100 | 100 |
| CFCA6 | 40° C. | 10 | 40 | 90 | 100 | 100 | 100 | 100 | 100 | 100 |
| FCA2 | 95° C. | 0 | 10 | 30 | 40 | 50 | 30 | 40 | 50 | 40 |
| FCA3 | 95° C. | 0 | 10 | 30 | 30 | 20 | 10 | 10 | 20 | 20 |
| FCA5 | 95° C. | 0 | 40 | 60 | 60 | 80 | 60 | 40 | 40 | 60 |
| CFCA6 | 95° C. | 20 | 60 | 100 | 100 | 100 | 100 | 100 | 100 | 100 |

These results show FCA2 to be a highly effective antifoam at both temperatures. FCA3 is highly effective at 95° C. and also effective (more effective than CFCA5) at 40° C. FCA5 is also highly effective at 95° C. but is less effective at 40° C.

EXAMPLE 6

A foam control agent was prepared as described in Example 1 but using an organosilicon resin (B) having a M/Q ratio of 2/1. The organosilicon resin dissolved in the siloxane copolymer (A).

The foam control agent of Example 6 was less effective than the foam control agents of Examples 1 to 5 in laundry foam control using detergent powders, but was effective at defoaming black liquor in a test in which the foaming black liquor sample taken from a pulp mill and the antifoam are shaken together for 10 seconds; the foam control agent of Example 6 was effective at collapsing the foam.

EXAMPLES 7 AND 8

Foam control agents were prepared according to Example 4, but using organosilicon resins of M/Q ratio 1.2/1 (Example 7) and 2/1 (Example 8). In Example 7, the organosilicon resin was not fully dissolved in the siloxane copolymer (A). In Example 8, the organosilicon resin dissolved in the siloxane copolymer (A).

EXAMPLES 9 TO 11

Foam control agents were prepared by the procedure of Example 1 using different siloxane copolymers (A) as follows:

Example 9 (FCA9)—as Example 1, but the proportion of divinyl crosslinking groups was increased to 1.15 Wt. % (about 1.5 mole %).

Example 10 (FCA10)—as Example 1, but the ethyl groups were replaced by 12–14C alkyl groups.

Example 11 (FCA11)—as Example 1, but the proportion of methyl α-methylstyrene siloxane groups was increased to 30 mole % and no divinyl crosslinking agent was used.

COMPARATIVE TESTS

Foam control agents FCA1, FCA9, FCA10 and FCA11, together with comparative foam control agent CFCA5 (a foam control agent according to EP 217501) and a comparative foam control agent CFCA7, similar to FCA1 but wherein the siloxane copolymer contained no methyl α-methylstyrene siloxane groups, were tested in a wash test as described above. The foam control agents were formulated as granules based on a zeolite carrier and a polycarboxylate binder and were all tested at a concentration of 0.12% by weight of detergent. The tests were carried out for a wash time of 45 or 55 minutes and the results are shown in Table 2 below (results up to 45 minutes shown, together with foam levels during 4 rinses)

EXAMPLE 12

2% by weight "Cabosil TS720" hydrophobic treated fumed silica was dispersed in 78% of the siloxane copolymer of Example 1 and 12% by weight of the MQ resin used in Example 1 dissolved in 8% octyl stearate was added, followed by 0.5% of a 20% aqueous KOH solution. The mixture was reacted at 80° C. for 6 hours then heated under vacuum at 140° C. for an hour to form foam control agent FCA12. The reaction promoted resin condensation and possibly some reaction of the resin with the silica.

EXAMPLE 13

Example 12 was repeated using the siloxane copolymer of Example 10 in place of that of Example 1, to produce foam control agent FCA13.

EXAMPLE 14

2% by weight hydrophobic treated fumed silica was dispersed in 78% of the siloxane copolymer of Example 1, and 12% of the MQ resin used in Example 1 dissolved in 8% octyl stearate was added to form foam control agent FCA14

EXAMPLE 15

Example 12 was repeated using "Cabosil EH-5" untreated fumed silica in place of the treated silica to produce foam control agent FCA15 Foam control agents FCA12 to FCA15 were tested under the conditions described in Examples 9 to 11. The results are shown in Table 3 below

TABLE 2

| Ex. | Temp ° C. | Wash time in minutes | | | | | | | | | Rinse | | | |
|---|---|---|---|---|---|---|---|---|---|---|---|---|---|---|
| | | 5 | 10 | 15 | 20 | 25 | 30 | 35 | 40 | 45 | 1 | 2 | 3 | 4 |
| FCA1 | 40 | 0 | 10 | 40 | 50 | 60 | 70 | 90 | 90 | 90 | 0 | 0 | 5 | 0 |
| FCA1 | 95 | 0 | 0 | 10 | 10 | 20 | 20 | 20 | 20 | 40 | 0 | 0 | 5 | 5 |
| FCA9 | 40 | 0 | 0 | 10 | 30 | 40 | 40 | 50 | 60 | 70 | 5 | 0 | 0 | 0 |
| FCA9 | 95 | 0 | 20 | 30 | 40 | 30 | 30 | 30 | 20 | 20 | 0 | 0 | 0 | 0 |
| FCA10 | 40 | 0 | 40 | 40 | 50 | 50 | 60 | 60 | 60 | 70 | 5 | 0 | 0 | 0 |
| FCA10 | 95 | 0 | 40 | 40 | 40 | 40 | 30 | 30 | 30 | 20 | 0 | 0 | 0 | 0 |
| FCA11 | 40 | 0 | 0 | 0 | 0 | 10 | 10 | 10 | 10 | 10 | | | | |
| FCA11 | 95 | 0 | 0 | 0 | 10 | 0 | 10 | 0 | 10 | 10 | | | | |
| CFCA5 | 40 | 0 | 50 | 90 | 100 | 100 | 100 | 100 | 100 | 100 | 40 | 30 | 40 | 15 |
| CFCA5 | 95 | 0 | 70 | 100 | 100 | 100 | 100 | 100 | 100 | 100 | 15 | 25 | 10 | 0 |
| CFCA7 | 40 | 20 | 90 | 100 | 100 | 100 | 100 | 100 | 100 | 100 | | | | |
| CFCA7 | 95 | 60 | 100 | 100 | 120 | 120 | 120 | 120 | 100 | 100 | | | | |

From Table 2, it can be seen that the four foam control agents according to the invention were effective at both temperatures, while CFCA5 and CFCA7 were not effective under these conditions.

TABLE 3

| Ex. | Temp | Wash time in minutes | | | | | | | | | Rinse | | | |
|---|---|---|---|---|---|---|---|---|---|---|---|---|---|---|
| | | 5 | 10 | 15 | 20 | 25 | 30 | 35 | 40 | 45 | 1 | 2 | 3 | 4 |
| FCA12 | 40 | 0 | 20 | 40 | 50 | 50 | 60 | 70 | 70 | 70 | 0 | 0 | 5 | 0 |
| FCA13 | 40 | 0 | 50 | 60 | 80 | 80 | 90 | 90 | 90 | 90 | 5 | 10 | 0 | 0 |
| FCA14 | 40 | 0 | 10 | 40 | 50 | 60 | 70 | 70 | 80 | 80 | 5 | 0 | 0 | 5 |
| FCA15 | 40 | 0 | 10 | 30 | 50 | 50 | 50 | 70 | 70 | 70 | 0 | 0 | 0 | 0 |
| FCA12 | 95 | 0 | 30 | 50 | 50 | 60 | 50 | 40 | 40 | 30 | 0 | 5 | 0 | 0 |
| FCA13 | 95 | 10 | 50 | 60 | 50 | 40 | 30 | 30 | 30 | 20 | 0 | 0 | 0 | 0 |
| FCA14 | 95 | 0 | 0 | 20 | 30 | 40 | 30 | 30 | 40 | 20 | 5 | 0 | 0 | 0 |
| FCA15 | 95 | 0 | 20 | 30 | 40 | 30 | 30 | 20 | 50 | 50 | 0 | 5 | 5 | 0 |

The results shown in Table 3 are fully comparable with those for CFCA5 and CFCA7 shown in Table 2, and show that FCA12 to FCA15 all were highly effective in controlling foam.

EXAMPLES 16 TO 19

Foam control agents FCA16 to FCA19 were prepared as described in Example 1 but using the following silicas in place of the "Sipernat D10":

Example 16—"Degussa R805" alkyl treated precipitated silica

Example 17—"Cabosil TS530" trimethylsilyl-treated fumed silica

Example 18—"Sipernat D17" silane-treated precipitated silica

Example 19—"HM-253" alkyl-treated fumed silica

Foam control agents FCA16 to FCA19 were tested under the conditions described in Examples 9 to 11. The results are shown in Table 4 below:

TABLE 4

| Ex. | Temp | Wash time in minutes | | | | | | | | | Rinse | | | |
|---|---|---|---|---|---|---|---|---|---|---|---|---|---|---|
| | | 5 | 10 | 15 | 20 | 25 | 30 | 35 | 40 | 45 | 1 | 2 | 3 | 4 |
| FCA16 | 40 | 0 | 0 | 0 | 30 | 50 | 50 | 70 | 70 | 80 | 5 | 0 | 5 | 5 |
| FCA17 | 40 | 0 | 0 | 0 | 0 | 0 | 0 | 30 | 50 | 50 | 5 | 10 | 5 | 5 |
| FCA18 | 40 | 0 | 20 | 40 | 50 | 70 | 70 | 70 | 80 | 80 | 0 | 10 | 5 | 0 |
| FCA19 | 40 | 0 | 0 | 10 | 10 | 40 | 60 | 60 | 80 | 80 | 0 | 0 | 5 | 0 |
| FCA16 | 95 | 0 | 0 | 0 | 20 | 20 | 30 | 30 | 40 | 20 | 0 | 0 | 5 | 5 |
| FCA17 | 95 | 0 | 0 | 0 | 0 | 0 | 0 | 10 | 10 | 20 | 0 | 0 | 5 | 5 |
| FCA18 | 95 | 0 | 30 | 40 | 40 | 20 | 20 | 20 | 30 | 40 | 0 | 5 | 0 | 5 |
| FCA19 | 95 | 0 | 0 | 20 | 40 | 40 | 30 | 40 | 40 | 40 | 0 | 5 | 0 | 0 |

The results shown in Table 4 are fully comparable with those for CFCA5 and CFCA7 shown in Table 2, and show that FCA15 to FCA18 all were highly effective in controlling foam.

EXAMPLES 20 TO 23

Foam control agents FCA20 to FCA23 were prepared according to Example using the following siloxane copolymers in place of the siloxane copolymer of Example 1. All the copolymers were trimethylsilyl-terminated and were prepared without the use of any crosslinking or branching agent.

Example 20—comprised on average 6 methyl α-methylstyrene siloxane groups and 57 methyl ethyl siloxane groups;

Example 21—comprised on average 12 methyl α-methylstyrene siloxane groups and 51 methyl ethyl siloxane groups;

Example 22—comprised on average 12 methyl α-methylstyrene siloxane groups and 51 methyl isobutyl siloxane groups;

Example 23—comprised on average 12 methyl α-methylstyrene siloxane groups and 51 methyl hexyl siloxane groups.

EXAMPLE 24

Following the procedure and using the materials of Example 1, a foam control agent was prepared comprising 85% by weight organopolysiloxane (A), 5% resin (B) and 5% silica filler (C). This was mixed with 5% molten stearyl alcohol at 70° C. 10% by weight of the resulting hot mix was granulated onto 90% of a carrier. Sodium carbonate was used as carrier to form FCA24a and maize starch was used as carrier to form FCA24b. FCA24a and FCA24b retained excellent foam control performance after storage.

That which is claimed is:

1. A foam control agent, comprising: (A) an organopolysiloxane material having at least one silicon bonded substituent of the formula X—Ph, wherein X denotes a divalent aliphatic organic group bonded to silicon through a carbon atom and Ph denotes an aromatic group, (B) an organosilicon resin and (C) a hydrophobic filler, the foam control agent being free from polydimethylsiloxane or containing less than 20% by weight polydimethylsiloxane based on the organopolysiloxane (A).

2. A foam control agent according to claim 1, wherein Ph is a moiety containing at least one benzene ring —$C_6R_5$, wherein each R is independently selected from hydrogen, halogen, hydroxyl, alkoxy groups having 1 to 6 carbon atoms or monovalent hydrocarbon groups having 1 to 12 carbon atoms or wherein two or more R groups together represent a divalent hydrocarbon group.

3. A foam control agent according to claim 1, wherein the average number of siloxane units per molecule in material (A) is from 5 to 5,000.

4. A foam control agent according to claim 1, wherein the material (A) is a polydiorganosiloxane comprising at least 50% diorganosiloxane units of the formula

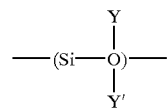

and up to 50% diorganosiloxane units of the formula

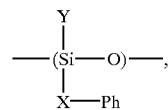

where Y is an alkyl group having 1 to 4 carbon atoms and Y' is an aliphatic hydrocarbon group having 1 to 24 carbon atoms.

5. A foam control agent according to claim 4, wherein the group Y' is an alkyl group having 1 to 6 carbon atoms.

6. A foam control agent according to claim 5, wherein the —X—Ph group is 2-phenylpropyl.

7. A foam control agent according to claim 1, wherein the group X is an alkylene group having 2 to 10 carbon atoms and Ph is a phenyl group.

8. A foam control agent according to claim 1, wherein the organopolysiloxane material (A) further comprises at least one crosslink between siloxane polymer chains selected from crosslinks of the formula —X'— and crosslinks of the formula —X'—Sx—X'—, wherein X' denotes a divalent aliphatic organic group bonded to silicon through a carbon atom and Sx is an organosiloxane group.

9. A foam control agent according to claim 1, wherein the organosilicon resin (B) is a non-linear silicone consisting of siloxane units of the formula $R'_a SiO_{4-a/2}$ wherein R' denotes a hydroxyl, hydrocarbon or hydrocarbonoxy group and wherein a has an average value of from 0.5 to 2.4.

10. A foam control agent according to claim 9, wherein the organosilicon resin (B) is a siloxane resin comprising monovalent trihydrocarbonsiloxy (M) groups of the formula $R''_3 SiO_{1/2}$ and tetrafunctional (Q) groups $SiO_{4/2}$ wherein R'' denotes an alkyl group and the number ratio of M groups to Q groups is in the range 0.4:1 to 1.1:1.

11. A foam control agent according to claim 9, wherein the organosilicon resin (B) has been contacted with a base in the presence of the organopolysiloxane material (A).

12. A foam control agent according to claim 1, wherein the organosilicon resin (B) is substantially dissolved in the organopolysiloxane material (A).

13. A foam control agent according to claim 1, wherein the organosilicon resin (B) is not wholly dissolved in the organopolysiloxane material (A).

14. A foam control agent according to claim 13, wherein organosilicon resin (B) has an average particle size of from 2 to 50 μm when dispersed in organopolysiloxane material (A).

15. A foam control agent according to claim 1, wherein the hydrophobic filler (C) is selected from the group consisting of silica, titania, ground quartz, alumina, aluminosilicates, polyethylene waxes, microcrystalline waxes, zinc oxide, magnesium oxide, salts of aliphatic carboxylic acids, cyclohexylamine, alkyl amides and $SiO_2$.

16. A foam control agent according to claim 15, wherein filler (C) is a silica filler with an average particle size of from 0.5 to 30 μm.

17. A foam control agent according to claim 16, wherein the organosilicon resin (B) has been contacted with a base in the presence of silica-filler (C).

18. A foam control agent according to claim 1, wherein organosilicon resin (B) is present at 2 to 30% by weight based on organopolysiloxane material (A).

19. A foam control agent according to claim 1, wherein hydrophobic filler (C) is present at 1 to 10% by weight based on organopolysiloxane material (A).

20. A foam control agent according to claim 1 which is in the form of an oil-in-water emulsion.

21. A water-dispersible foam control composition comprising a foam control agent according to claim 1 dispersed in a water-dispersible carrier.

22. A foam control agent according to claim 1 which is in particulate form.

23. A foam control agent according to claim 22, wherein the particulate foam control agent additionally comprises a binder and a carrier.

24. A foam control agent according to claim 23, wherein the binder is selected from polyoxyalkylene polymers, polycarboxylate polymers or cellulose ethers.

25. A foam control agent according to claim 23, wherein the binder is an organic compound having a melting point of from about 40 to 80° C. and which in its liquid form is miscible with the organopolysiloxane (A) so as to form a homogeneous. liquid which upon cooling forms a monophasic wax-like substance.

26. A foam control agent according to claim 23, wherein the carrier is selected from zeolite, sodium tripolyphosphate, sodium sulphate, sodium perborate or sodium carbonate.

27. A detergent based composition comprising a detergent component and 0.01 to 5% by weight based on the detergent component of a foam control agent according to claim 1.

28. A detergent based composition comprising an organopolysiloxane material to control foam, wherein the organopolysiloxane material has at least one silicon-bonded substitutent of the formula X—Ph, where X denotes a divalent aliphatic organic group bonded to silicon through a carbon atom and Ph denotes an aromatic group, an organosilicon resin and a hydrophobic filler, and the detergent based composition being free from polydimethylsiloxane or containing less than 20% by weight polydimethylsiloxane based on the said organopolysiloxane material having at least one silicon-bonded substituent of the formula X—Ph.

* * * * *